April 10, 1951 S. SIKORA 2,548,074
GYROSCOPE
Filed June 28, 1949 2 Sheets-Sheet 1

INVENTOR.
Stanley Sikora
BY Victor J. Evans & Co.
ATTORNEYS

April 10, 1951 S. SIKORA 2,548,074
GYROSCOPE
Filed June 28, 1949 2 Sheets-Sheet 2

INVENTOR.
Stanley Sikora
BY Victor J. Evans & Co.
ATTORNEYS

Patented Apr. 10, 1951

2,548,074

UNITED STATES PATENT OFFICE 2,548,074

GYROSCOPE

Stanley Sikora, Lancaster, N. Y.

Application June 28, 1949, Serial No. 101,775

3 Claims. (Cl. 74—5.37)

This invention relates to a gyroscope, and more particularly to a gyroscope for stabilizing a vehicle, such as an automobile.

The object of the invention is to provide a gyroscope which is adapted to be mounted in a vehicle and wherein the gyroscope is constructed so as to oppose disturbing external forces acting about any axis whatever and tending to disturb the vehicle that is to be stabilized.

Another object of the invention is to provide a gyroscope for a vehicle which will eliminate accidents due to the vehicle becoming off balance and overturning, and which will provide smoother operation of the vehicle.

A further object of the invention is to provide a gyroscope which is simple and inexpensive to manufacture.

Other objects and advantages will be apparent during the course of the following description.

In the accompanying drawings, forming a part of this application, and in which like numerals are used to designate like parts throughout the same:

Figure 1:
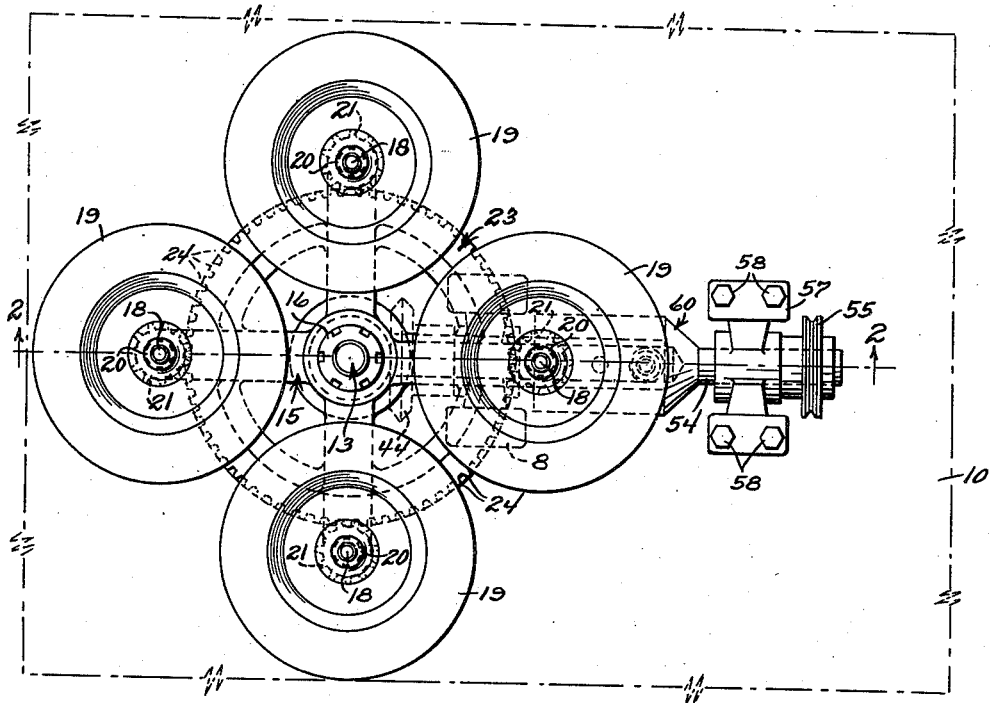
Figure 1 is a top plan view of the gyroscope, according to the present invention.
Figure 5:
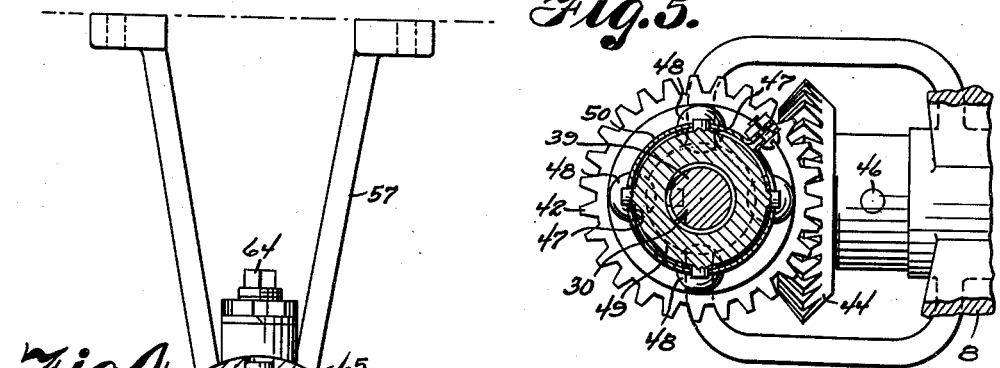
Figure 5 is an enlarged sectional view taken on the line 5—5 of Figure 2.
Figure 4:
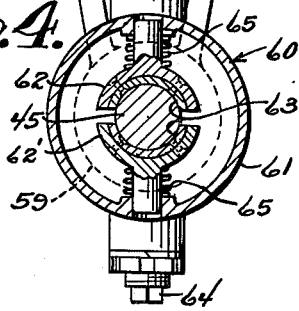
Figure 4 is an enlarged sectional view taken on the line 4—4 of Figure 3.
Figure 2:
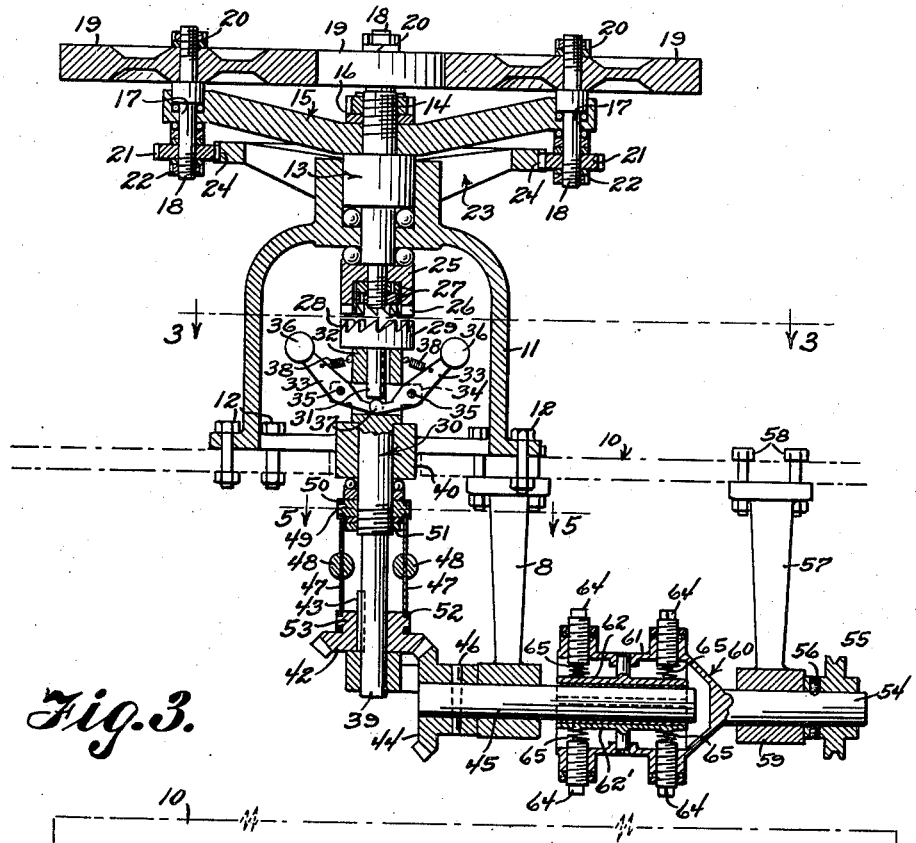
Figure 2 is a sectional view taken on the line 2—2 of Figure 1.
Figure 3:
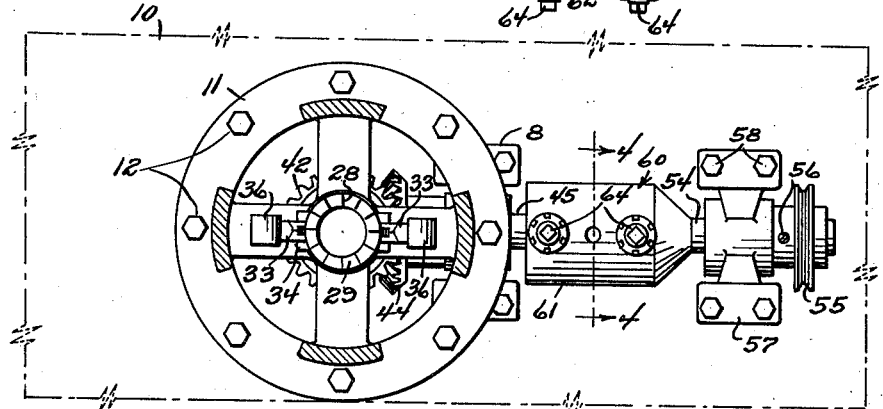
Figure 3 is a sectional view taken on the line 3—3 of Figure 2.

Referring in detail to the drawings, there is shown a gyroscope which is adapted to be mounted below the driver's seat in a vehicle, such as an automobile. The numeral 10 designates a supporting member, such as the vehicle floor board, and a bracket 11 is supported on the floor board 10 and the bracket 11 is secured to the floor board 10 by suitable bolt and nut assemblies 12, Figure 2. Rotatably supported by the bracket 11 is a gear shaft 13, the gear shaft 13 being provided with an upper exteriorly threaded portion 14. A rotary spider 15 is positioned on the portion 14 of the gear shaft 13 and nuts 16 are threaded onto the portion 14 for maintaining the spider 15 in place on the gear shaft 13 so that as the gear shaft 13 rotates the spider 15 rotates therewith.

The spider 15 is provided with a plurality of openings 17 adjacent its outer periphery and a pinion 18 projects rotatably through each of the openings 17. Mounted on each of the pinions 18 is a fly wheel 19, there being shown four of the fly wheels 19 and the fly wheels are arranged in the same plane. Suitable nuts 20 are arranged in threaded engagement with the upper end of the pinion 18 for maintaining the fly wheels 19 thereon. A gear 21 is arranged on the lower end of each of the pinions 18, and nuts 22 are arranged in threaded engagement with the lower end of the pinion 18 for maintaining the gear 21 thereon.

Formed integral with the upper end of the bracket 11 or secured thereto is a stationary spider 23, and the spider 23 has a plurality of spaced gear teeth 24 on its outer periphery, the gear teeth 24 meshing with the teeth on the gears 21. Mounted on the lower end of the gear shaft 13 is a gear 25 which has teeth 26 on its lower end. Nuts 27 are arranged in threaded engagement with the lower end of the gear shaft 13 for maintaining the gear 25 thereon. Mounted for movement into and out of engagement with the teeth 26 are teeth 28 which are formed on the upper end of a gear 29. The gear 29 is secured to the upper section 31 of a slip shaft 30, and the upper section 31 is slidably arranged in a sleeve 32.

A means is provided for allowing the gear 29 to move away from the gear 25 when the speed of the vehicle engine decreases as when the vehicle slows down or comes to a temporary stop whereby the fly wheels 19 will continue to rotate as the result of the inertia thereof. This means comprises a plurality of arms 33 which are pivotally connected to ears 34 by a pin 35. Each of the arms 33 has a weight 36 on its outer end, and the inner end 37 is arranged in engagement with the lower end of the upper section 31. Thus, normally the vehicle engine is turning over at a sufficient speed to cause the arms 33 to expand the small springs 38 and as the arms 33 swing out due to centrifugal force, the arms 33 pivot about the pins 35 whereby the lower ends of the arms raise the upper section 31 and thus move the gear 29 into engagement with the gear 25 to thereby cause rotation of the fly wheels 19.

The lower section 39 of the slip shaft 30 is rotatably supported in a bushing 40, the bushing 40 having a flange secured to the floor board 10 by suitable bolt and nut assemblies 41. A bevel gear 42 is keyed to the lower end of the section 39 as at 43 so that the bevel gear 42 rotates along with the slip shaft 30 and the bevel gear 42 is also free to move longitudinally therealong. The bevel gear 42 is mounted for movement into and out of engagement with a bevel gear 44 which is mounted on an end of a driven shaft 45, the shaft 45 being rotatably supported by a bearing bracket 8. A pin 46 maintains the bevel gear 44 mounted on the driven shaft 45.

Normally, the gear 42 is in engagement with the gear 44, but in the event that the vehicle engine speeds up beyond a predetermined degree, a means is provided for moving the bevel gear 42 away from the bevel gear 44 in order to prevent too rapid a rotation of the fly wheels 19. This means comprises a plurality of spring members 47 which each have a weight 48 arranged intermediate the ends thereof. The upper ends of the spring member 47 are secured to a collar 49 by a clamp 50, there being nuts 51 for maintaining the collar 49 in place on the shaft 30. Similarly, a clamp 52 secures the lower ends of the spring members 47 to a shoulder 53 which is formed integral with the gear 42. Thus, in the event that the driven shaft 45 is rotating too rapidly, the intermediate portions of the spring members 47 will be pulled outwardly as the result of the centrifugal force exerted by the weights 48 so that the gear 42 will be lifted upwardly on the lower section 39 of the fixed shaft 30.

Arranged in end-to-end relation with respect to the driven shaft 45 is a drive shaft 54 which has a pulley 55 secured thereto by set screws 56. A suitable belt is adapted to be trained over the pulley 55 and connected to the vehicle drive shaft in order to rotate the shaft 54. A bracket 57 is secured to the floor board 10 by means of bolt and nut assemblies 58, Figure 2, and the bracket 57 carries a bearing block 59 which rotatably supports the drive shaft 54 therein.

A clutch or slip coupling is provided for connecting the drive shaft 54 to the driven shaft 45 and this clutch is so constructed that parts of the gyroscope will not be damaged due to stress and strain caused by too rapid acceleration or deceleration of the vehicle. The clutch is indicated generally by the numeral 60 and the clutch includes a shell 61 which is secured to an end of the drive shaft 54, the shell 61 extending over the driven shaft 45. Arranged within the shell 61 and carried thereby is a pair of brake shoes 62 and 62′, there being a brake lining 63 arranged within each of the brake shoes 62 and 62′ for engagement with the driven shaft 45.

A means is provided for adjusting the tension of the brake linings 63 on the driven shaft 45. Thus, arranged in threaded engagement with the shell 61 is a plurality of support members 64 which each have a coil spring 65 interposed between their inner end and the outer surface of the brake shoes 62 and 62′. Thus, by adjusting the support members 64 in the shell 61, the tension on the brake linings 63 can be adjusted as desired.

The operation of the gyroscope is as follows:

The drive shaft 54 is rotated by means of a belt (not shown) which is trained over the pulley 55, the belt being driven by a suitable power take-off from the vehicle engine. Rotation of the drive shaft 54 causes the driven shaft 45 to rotate and since the gears 44 and 42 are normally arranged in engagement with each other, this will result in rotation of the split shaft 30. In the event that the driven shaft 45 is rotating too fast, the spring members 47 will be flexed outwardly to thereby raise the gear 42 away from the gear 44 so that the fly wheels 19 will be prevented from exceeding a predetermined speed. Normally, the slip shaft 30 is rotated at a sufficient speed to cause the arms 33 to urge the gear 29 into engagement with the gear 25. When the gear 25 rotates it causes the gear shaft 13 to rotate and this rotates the spider 15. Rotation of the spider 15 carries the pinions 18 and the pinions 18 each have a gear 21 mounted on their lower end. The gears 21 are arranged in engagement with the gear teeth 24 on the member 23 so that as the spider 15 rotates it causes the pinions 18 to rotate. Mounted on the upper end of each of the pinions 18 is one of the fly wheels 19, so that rotation of the pinions 18 causes the fly wheels 19 to rotate.

In the event that the speed of the vehicle engine slows down, as when the vehicle is coming to a temporary stop, then the arms 33 will be pulled inwardly by the springs 38 so that the gear 29 will drop out of engagement with the gear 25 whereby the fly wheels 19 will continue to rotate freely by their own inertia.

From the foregoing, it is apparent that a gyroscope has been provided which will stabilize a moving vehicle, such as an automobile. The gyroscope is constructed with a minimum number of parts and is therefore easy to manufacture. The gyroscope is compactly constructed and the plurality of revolving fly wheels 19 will be effective to stabilize the vehicle. The gyroscope includes a means for preventing the fly wheels from rotating too rapidly in the event that the vehicle exceeds a predetermined speed, and the gyroscope is also provided with means for maintaining the fly wheels 19 spinning or revolving when the vehicle slows down temporarily. Further, the clutch 60 is so constructed that the various parts of the gyroscope will not be damaged by stress or strain as the result of too rapid acceleration of the vehicle.

What I claim is:

1. In a device for maintaining the equilibrium of a vehicle, the combination with a drive shaft, of a plurality of fly wheels arranged in the same plane, means for connecting said drive shaft to said fly wheels for rotating the latter, means for preventing said fly wheels from exceeding a predetermined speed of rotation, means for preventing the speed of said fly wheels from diminishing when the vehicle slows down temporarily, and a slip coupling for preventing breakage of the parts of the gyroscope due to stress and strain when the vehicle is accelerating.

2. In a device for maintaining the equilibrium of a vehicle, a drive shaft adapted to be connected to a source of power, a driven shaft arranged in alignment with said drive shaft, a slip coupling connecting said drive shaft to said driven shaft, a first bevel gear mounted on an end of said driven shaft, a slip shaft arranged at right angles with respect to said driven shaft, a second bevel gear slidably arranged on the end of said slip shaft and adapted to mesh with the gear on said driven shaft, means for moving said second bevel gear out of engagement with said first bevel gear when the slip shaft exceeds a predetermined speed, a gear shaft arranged in alignment with said slip shaft, means for supporting said shafts, a dog clutch for selectively connecting said gear shaft to said slip shaft, a plurality of fly wheels arranged in the same plane, and means operatively connecting said gear shaft to said fly wheels for rotating the latter.

3. In a device for maintaining the equilibrium of a vehicle, a drive shaft adapted to be connected to a source of power, a driven shaft arranged in alignment with said drive shaft, a slip coupling connecting said drive shaft to said driven shaft, a first bevel gear mounted on an end of said driven shaft, a slip shaft arranged at right angles with respect to said driven shaft, a second bevel gear slidably arranged on the end of said slip shaft and adapted to mesh with the gear on said driven shaft, a gear shaft arranged in alignment with said slip shaft, means for supporting said shafts, a dog clutch for selectively connecting said gear shaft to said slip shaft, a plurality of fly wheels arranged in the same plane, and means operatively connecting said gear shaft to said fly wheels for rotating the latter.

STANLEY SIKORA.

REFERENCES CITED

The following references are of record in the file of this patent:

UNITED STATES PATENTS

| Number | Name | Date |
|---|---|---|
| 807,195 | Noalhat et al. | Dec. 12, 1905 |
| 960,838 | Daugherty | June 7, 1910 |

FOREIGN PATENTS

| Number | Country | Date |
|---|---|---|
| 27,881 of 1908 | Great Britain | Apr. 29, 1909 |